United States Patent [19]

Capel

[11] 4,311,954
[45] Jan. 19, 1982

[54] ELECTRIC MODULATOR APPARATUS WITH SYNCHRONIZED CONDUCTANCE CONTROL MODE

[75] Inventor: Antoine Capel, Ramonville, France

[73] Assignee: Organisation Europeenne de Recherches Spatiales, Paris, France

[21] Appl. No.: 135,724

[22] Filed: Mar. 31, 1980

[30] Foreign Application Priority Data

Apr. 9, 1979 [BE] Belgium .................. 194484

[51] Int. Cl.³ ..................................... H02P 13/32
[52] U.S. Cl. .................. 323/222; 323/284; 323/285; 323/289
[58] Field of Search ............ 323/17, DIG. 1, 222, 323/284, 285, 289; 363/19, 21

[56] References Cited

U.S. PATENT DOCUMENTS

| | | | |
|---|---|---|---|
| 3,396,326 | 8/1968 | Kisrow | 323/17 |
| 3,562,623 | 2/1971 | Farnsworth | 363/20 |
| 3,629,622 | 12/1971 | Denenberg | 323/284 |
| 3,805,094 | 4/1974 | Orlando | 323/289 |
| 3,863,126 | 1/1975 | Colyn | 323/9 |

OTHER PUBLICATIONS

EDN, (USA), vol. 22, No. 6, pp. 47–48, 51, 53, Mar. 20, 1977.

Primary Examiner—William H. Beha, Jr.
Attorney, Agent, or Firm—McCormick, Paulding & Huber

[57] ABSTRACT

A synchronized electric modulator for the control in synchronized conductance control mode of a regulation unit, thereby to assure a close control of the current peak value. A current reference is generated which varies as a function of a command signal representing the deviation of a parameter value in a system from its reference value. The current through the load is monitored and sensed to be compared to the current reference so as to produce a control signal for the regulation unit, which is dependent on the variation of the sensed current under the synchronization of external clock pulses.

4 Claims, 3 Drawing Figures

ELECTRIC MODULATOR APPARATUS WITH SYNCHRONIZED CONDUCTANCE CONTROL MODE

BACKGROUND OF THE INVENTION

The present invention relates to a switching regulation apparatus incorporating an electric control modulator operating in conductance control mode.

Voltage or current regulation using a sampling mode has evolved during the last years to the development of modulator arrangements for the purpose of improving the static performances and the dynamic behaviour of the regulators. Some systems have been disclosed which use magnetic modulators adapted to well defined regulators (buck or buck-boost voltage regulators). These known systems have led to discontinuous mode operation which is capable of regulating limited power only. Further, these systems are relatively complex and cumbersome.

A substantial improvement has already been perfected in the art by a regulation apparatus incorporating an electric modulator designed to operate in conductance control mode. In this apparatus the minimum and maximum limits of the current are controlled by a control voltage, with a free running frequency. Such an apparatus conciliates the static and dynamic advantages obtained with heretofore irreconcilable operation modes (continuous conduction and discontinuous conduction) of the conventional regulators but however, it has limited power capability and it operates at a free running frequency dependent on the parameters of the circuitry.

SUMMARY OF THE INVENTION

The problem which the invention aims to solve is providing a regulation apparatus which permits modular units to be realized having power capabilities ranging about one kilowatt per module while having the dynamic performances of units with lower power capabilities.

The object of this invention is to provide an apparatus for the control of an operating parameter of an installation in which the electric current is monitored by a command signal with a close control of the current peak value.

In accordance with the invention the regulation apparatus comprises an electric modulator clocked by external clock pulses to produce a drive signal for a regulating switch means. The modulator includes a switching device connected to vary the duration of said drive signal depending on a control voltage related to the variation of the sensed current.

The advantages of the apparatus according to the invention are mainly:

(a) the control of the peak value of the current protects the installation and the components against overcurrents and it permits the realization of units having higher power capability while having the dynamic performances of units with lower power capability, (b) modular systems can be implemented by simply paralleling modules without increasing the complexity of the system, each module being clocked at determined times, (c) the dynamic behaviour of the regulation apparatus reduces the order of the transfer function of the filtering system to a first order function, thereby resulting in a 90° maximum phase shift which compares favorably to the 180° maximum phase shift introduced by the continuous mode operating regulators, (d) the dynamic behaviour of the regulating apparatus results in excellent stability and overall dynamic response to the variations of the input voltage and the load as demonstrated by oscilloscope observations, (e) the regulation apparatus can be implemented in thick layer technology, which is of prime importance since this allows a systematic approach for the standardization of regulators for a great number of applications; such an approach is feasible thanks to the increase in power efficiency resulting from the arrangement of active components for accelerating the switching-off action of the main regulating switch, (f) the concept of this invention enables a standard module to be implemented in thick layer technology with the capability of driving switching regulation units.

The concept of this invention can be applied to the regulation of analog parameters of the boost, buck or buck-boost type and also to the protection of electricity distribution circuitries requiring a control of the pulse-width modulation (P.W.M.) type.

Another object of the invention is a standard low-level electric control modulator module intended to drive conventional switching regulation units in a synchronous way.

DESCRIPTION OF AN EXEMPLARY EMBODIMENT

Figure 1:
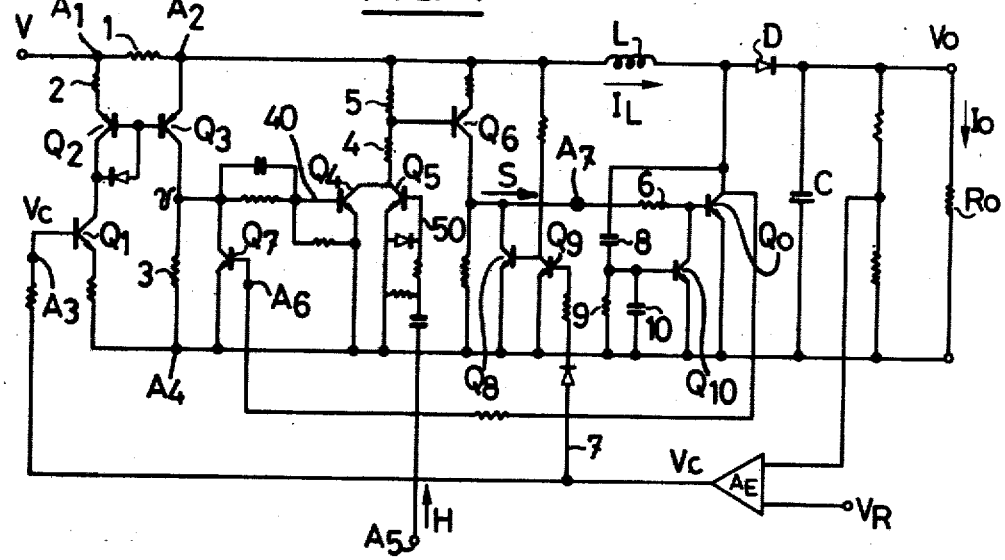
FIG. 1 is a schematic diagram of a voltage regulator incorporating the apparatus of the invention.

The principle and regulation mechanism of the apparatus according to the invention are described in their application to the regulation of an electric voltage. The circuit diagram shown in FIG. 1 illustrates the circuitry of a voltage boost regulator, that is the type of regulator which is the most currently used and which has the most critical operation. The parameter to be regulated in this application is the voltage Vo applied across a load represented by resistor Ro and capacitor C. The regulation is performed through a conventional regulation unit, known per se, connected across the load and including a controlled regulating switch Qo, an induction coil L for energy storage and a diode D. These elements as well as the error amplifier $A_E$ are conventional elements currently used in a switching voltage regulator. The error amplifier $A_E$ is connected to produce a command signal Vc representing the deviation of the output voltage Vo from a reference voltage $V_R$.

This invention is particularly concerned with a synchronized control modulator connected to produce the drive signal S for driving the base of switching transistor Qo in order to control the switching operation thereof at a fixed frequency.

The purpose of the modulator in accordance with this invention is to control the application of the drive signal S under monitoring of the inductor current $I_L$ such that the quantity of electricity delivered from the regulator within a given time period is dependent on the command signal Vc while the current Io through the load is limited to a predetermined peak value $I_M$. The inductor current $I_L$ is sensed by the voltage drop across resistor 1. It is this voltage drop that is controlled since it is compared to a reference voltage produced across resistor 2 by the conduction of transistor $Q_1$ which is turned-on by the command signal $V_c$ being applied to the base electrode of $Q_1$. Thus the reference voltage is directly proportional to the command signal Vc. Transistors $Q_2$ and $Q_3$ form a comparator arrangement which produces in the collector of transistor $Q_3$ a current the variation of which is monitored by the deviation between the voltage drops across the resistors 1 and 2. When these voltage drops are equal, transistor $Q_3$ substantially becomes non-conducting and the voltage $v$ across resistor 3 becomes zero. The voltage $v$ is the control voltage which governs the switching mechanism of the regulating transistor $Q_o$ as will be described hereinafter.

The transistors $Q_4$ and $Q_5$ form a switching device having the purpose of coupling the suitable drive signal S to the base electrode of transistor $Q_o$. The switching device $Q_4$-$Q_5$ has two inputs: the base 40 of transistor $Q_4$ which accepts the control voltage v and the base 50 of transistor $Q_5$ which accepts timing pulses H from an external clock. The operation of the modulator is synchronized by the clock pulses H. For the purpose of describing this operation, it will now arbitrarily be assumed that transistor $Q_o$ is turned-on by a clock pulse H applied to the base of transistor $Q_5$. The collector voltage of $Q_5$ is high and causes a drive signal S to be coupled to the base of transistor $Q_o$ through the circuit comprising resistor 4, transistor $Q_6$ and resistor 6. At that moment, the collector voltage of $Q_o$ is zero or low and the transistor $Q_7$ which is connected in parallel with resistor 3 switches off. When a control voltage $v$ occurs, transistor $Q_4$ is turned-on and its collector voltage holds a drive signal S to be coupled to the base of transistor $Q_o$. The latter is thereby held turned-on after the clock pulse H is applied.

While transistor $Q_o$ is turned-on, the inductor current $I_L$ increases. This increasing current is sensed across resistor 1 as explained hereinbefore, and its variation causes the conduction of transistor $Q_3$ to vary, which causes the control voltage $v$ to decrease if we assume that the command signal Vc is constant. Transistor $Q_o$ is held conducting until the control voltage $v$ is zero since when this occurs ($v=0$) transistors $Q_4$ and $Q_6$ are turned off and consequently the base of transistor $Q_o$ is no more fed with current. Transistor $Q_o$ then switches off and will not be turned on again until the next clock pulse H is applied.

The purpose of transistor $Q_7$ is to decouple the control voltage $v$ from the base of transistor $Q_o$ by cancelling said control voltage during the remaining portion of the cycle. When $Q_o$ does not receive current any more in its base, its collector voltage is high and causes transistor $Q_7$ to conduct, whereby resistor 3 is shorted and the base of $Q_4$ is grounded until the next clock pulse H occurs. The regulation process is then restarted.

As apparent from FIG. 1 current is injected in the base of transistor $Q_o$ only when transistor $Q_8$ is switched off, that is when transistor $Q_9$ is effectively held conducting by the command signal Vc being coupled to its base by circuit line 7. This will occur as far as said command signal Vc exceeds a predetermined threshold. As soon as the command signal Vc decreases down to said threshold, which corresponds to the occurrence of a surge, transistor $Q_9$ switches off and transistor $Q_8$ saturates, whereby the base of transistor $Q_o$ is grounded.

A high efficiency is obtained by connecting the circuit comprising resistor 9, capacitor 8 and transistor $Q_{10}$, said circuit having the purpose of differentiating the collector voltage of transistor $Q_o$ when said collector switches to high, that is when $Q_o$ switches off. Transistor $Q_{10}$ then is a short during the transients, whereby the switching-off of transistor $Q_o$ is accelerated and the losses are reduced.

The regulation process as described in the foregoing permits the voltage Vo to be regulated by monitoring and controlling the current, with a close control of the current peak value. The control of the current which is related to the command signal Vc, ensures that the current which the load needs at the required voltage is effectively delivered.

The close control of the peak current has great influence on the reliability and performances of the regulation units, thereby allowing the operation limits of the components to be adjusted and the maximum performances to be utilized. This results in a substantial advantage from the viewpoint of the power which can be handled in practice: as a practical matter this invention permits 3 kW modules to be designed using a switching transistor $Q_o$ having a 50 A current capability and being operable under 100 V D.C. This power capability is to be compared to the power capability of 300 W which is the present limit for a conventional regulation module.

Paralleling modules of the same type is made very easy with the apparatus of the invention since the power sharing per module is directly monitored by the command signal Vc whereas the switching of the modules is determined by arranging their respective clocks. This latter feature plays an essential part in the dimensioning of the filtering circuitry.

Furthermore, the output characteristic of the regulation apparatus according to the invention can be adapted by the type of regulation unit associated therewith. When limiting the deviation of the analog command signal Vc, e.g. by means of a Zener diode, the limited maximum current characteristic can be converted into a foldback characteristic.

It will be obvious to those skilled in the art that the regulation apparatus in accordance with this invention can be implemented in various embodiments deviating from the exemplary embodiment described in the foregoing and that it applies to other types of regulation mode as well.

Further, the apparatus of this invention can to be used to drive the power stages of units requiring P.W.M. type control.

Figure 2:
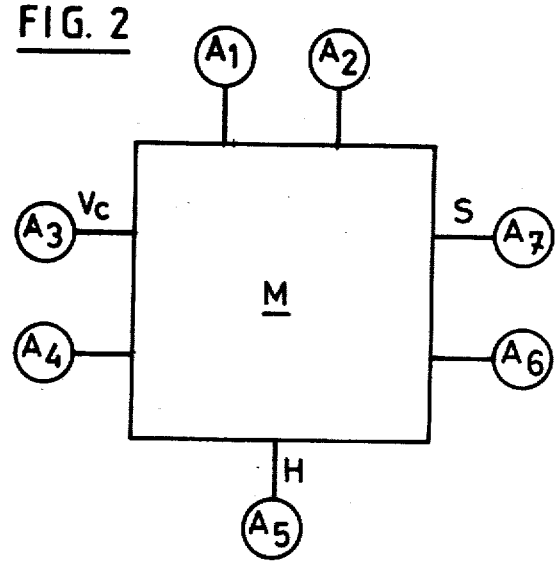
FIG. 2 is a representation of a standard control module according to the invention, showing the external connection terminals.

The concept of the apparatus according to the invention advantageously permits the realization of a standard low level electric control modulator using thick layer technology suitable to drive controlled switching regulation units in a synchronous way. FIG. 2 shows the arrangement of the external connection terminals of such a standard module M. The terminals are denoted as $A_1$ to $A_7$ and correspond to the connection points of same denotation in FIG. 1. The use of these terminals are as follows:

$A_1$-$A_2$ connection terminals for a current sensor device $A_3$ application of the command signal Vc $A_4$ connection to ground $A_5$ application of the clock pulses H A₆ application of the lock signal A₇ output of the drive signal S for regulation unit.

Figure 3:
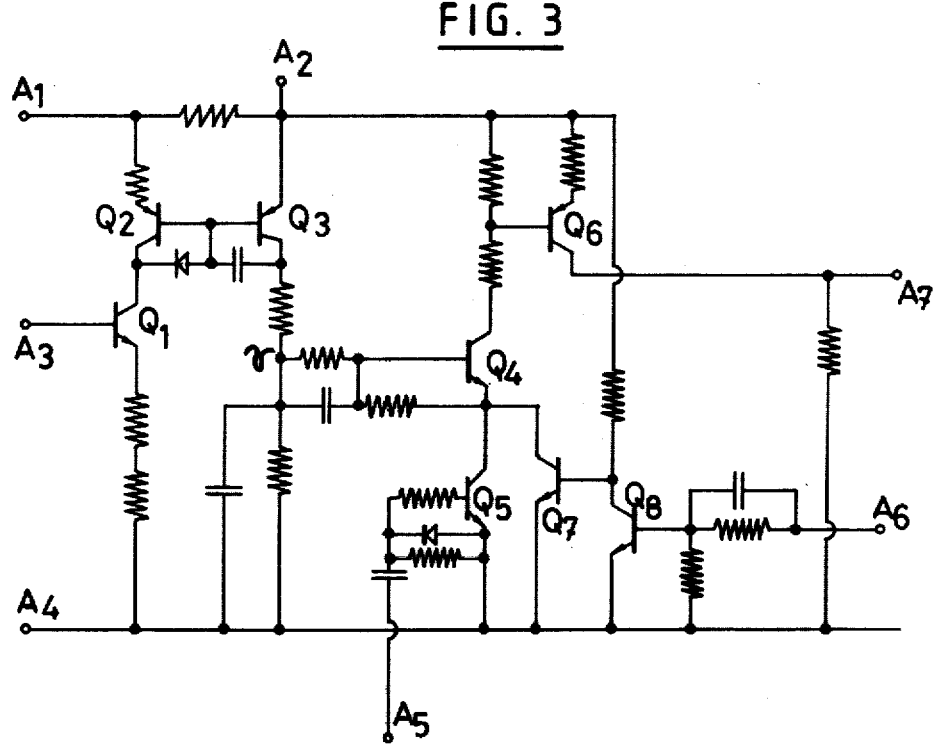
FIG. 3 is a schematic diagram of an exemplary typical circuit for the implementation of a standard module according to FIG. 2.

FIG. 3 is a schematic diagram of a variation of the exemplary embodiment of FIG. 1 which is particularly suitable for being implemented as a thick-layer standard module. Comparing this circuitry to FIG. 1, the same reference numerals denote the same functional units. In particular, Q₁ is the current reference generator, Q₂-Q₃ form the current comparator device, Q₄-Q₅ form the switching device clocked by the time pulses H and controlled by the control voltage v which is related to the current variation, and Q₇ is the lock element. The operation of the circuitry of FIG. 3 is quite similar to the operation described in the foregoing.

What is claimed is:

1. In an apparatus for regulating an electric circuit parameter which is related to an electric current feeding a regulation unit including a regulating switch arranged for being switched between a first non-conducting logic state and a second conducting logic state in response to a drive signal, an electric modulator operating in synchronized conductance control mode and comprising:

current sensor means connected to sense said electric current and to generate a sensing signal representing said current;

current reference signal generator means connected to be responsive to a command signal for generating a current reference signal the amplitude of which is a function of said command signal;

comparator means connected to compare said current sensing signal to said current reference signal for producing a control voltage related to the current difference;

a switching device connected to produce said drive signal for the regulating switch, said switching device comprising first switch means connected to accept clock pulses and transfer same as a drive signal for switching said regulating switch from its first logic state to its second logic state, and second switch means connected to accept said control voltage and transfer same for holding said regulating switch in its second logic state after a clock pulse is applied, and third switch means connected to hold said second switch means in a non-conducting state in response to a signal indicating that said regulating switch is reset to its first logic state.

2. An apparatus according to claim 1, further comprising fourth switch means connected to lock said regulating switch in its first logic state in response to said command signal not being greater than a predetermined threshold.

3. An apparatus according to claim 1 or 2, further comprising circuit means connected to force said regulating switch in its first logic state in response to a signal indicating that it is switching to said first logic state in order to accelerate the switching-off.

4. A standard low-level electric modulator apparatus for synchronously driving a regulation unit including a controlled regulating switch arranged for being switched from a first logic to a second logic state in response to a drive signal, said apparatus comprising a thick layer module including input terminal means for accepting a current sensing signal from a current sensor device;

output terminal means for said drive signal;

current reference signal generator means connected to be responsive to a command signal for generating a current reference signal which is a function of said command signal;

comparator means connected to compare said current sensing signal to said current reference signal for producing a control voltage related to the current difference;

a switching device connected to produce said drive signal for the regulating switch, said switching device comprising first switch means having an input terminal for application of clock pulses and connected to transfer said clock pulses to said output terminal means and second switch means connected to accept said control voltage and transfer same to the output terminal means for holding said external regulating switch in its second logic state after a clock pulse is applied.

* * * * *